Aug. 26, 1969 J. FOUFOUNIS 3,463,497

SELECTION DEVICE FOR AUTOMATIC RECORD CHANGER

Filed Sept. 18, 1967 4 Sheets-Sheet 1

Inventor:
Jean Foufounis
By Robert E. Burns
Atty.

SELECTION DEVICE FOR AUTOMATIC RECORD CHANGER

Inventor:
Jean Foufounis
By Robert C. Burns
Atty.

Inventor:
Jean Foufounis
By Robert S. Burns
atty.

Inventor:
Jean Foufounis
By Robert E. Burns
Atty.

United States Patent Office 3,463,497
Patented Aug. 26, 1969

3,463,497

SELECTION DEVICE FOR AUTOMATIC RECORD CHANGER

Jean Foufounis, 27 bis Chemin de Chene, 1020 Renens, Switzerland

Filed Sept. 18, 1967, Ser. No. 668,605
Claims priority, application Switzerland, Sept. 20, 1966, 13,566/66
Int. Cl. G11b *17/08, 17/22*
U.S. Cl. 274—10 9 Claims

ABSTRACT OF THE DISCLOSURE

A mechanical selection device for an automatic record changer has two sets of movable elements, the elements of one are equidistantly spaced apart by the distance between spaced record positions in the changer, while the elements of the second set are equidistantly spaced by a distance corresponding to the spacing of the first set less the distance between two adjacent record positions, the two sets being so related and operated as to select any desired individual record positions for release of a record.

Already known are numerous systems which can be adapted to fully automatic record changers of the jukebox type and which permit to select in advance a given recording on a record.

In certain devices, the command is effected by electromagnets which has the disadvantage of requiring a large number of electromagnetic elements, of contacts, of relays, etc. and therefore a delicate, complicated and complex circuit.

Other devices are mechanical and comprise for example a marker having a single electromagnet which the user can move simultaneously along pushbuttons thus operating the mechanism in front of a graduated band which permits the choice of a given selection.

It is evident that for an apparatus comprising a considerable number of selections, the records are very close to one another and it is rather difficult mechanically to make a marker which stops exactly in front of a pushbutton unless the driving of this marker is considerably slowed down, in which case the selection will be delicate and will require much time.

The disadvantage of such systems resides in the fact that the user does not like a complicated manipulation and prefers to have the impression of using an electrically controlled apparatus.

In electrical systems, there has already been introduced a command by means of a keyboard comprising two rows of keys, the first provided with levers which permit the selection of about ten records and the second provided with numbers for selecting one record.

The present invention has for its object a mechanical selection device for an automatic record changer comprising a number of selection pushbuttons equal to that of the records, characterized by the fact that the pushbuttons are actuated by means of two movable elements, controlled manually either together or separately.

The accompanying drawing represents by way of example two embodiments of the object of the present invention.

FIGURE 1 is a cross-sectional view of the chassis supporting the records.

FIGURE 1*a* is an underneath view of the chassis.

FIGURE 2 is a side view of the first movable element.

FIGURE 2*a* is a top view of said movable element.

FIGURE 3 is a side view of two movable elements.

FIGURE 3*a* is a side view of FIGURE 3.

Figure 1:
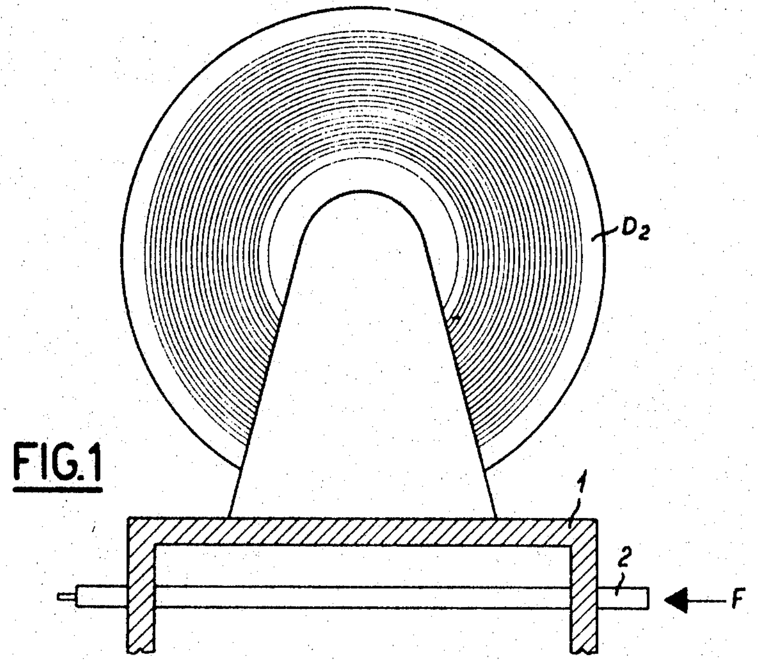
Figure 1A:
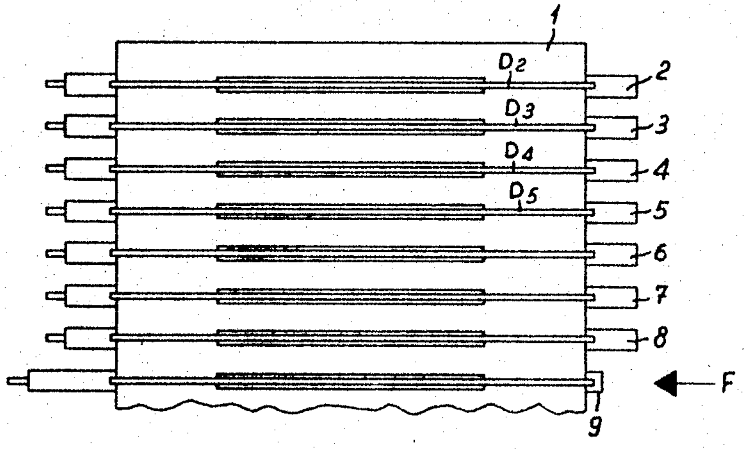

In FIGURE 1 are represented the chassis 1 of a record changer, supporting 20 disks D2, D3, etc., arranged in a basket and to which correspond selection rod 2, 3, etc. In order to choose one of the records, record D9, for example, it is necessary that corresponding rod 9 be pushed in by means of the two-stage system described below by which one of the twenty records is selected on a 4 x 5 basis.

Figure 2:
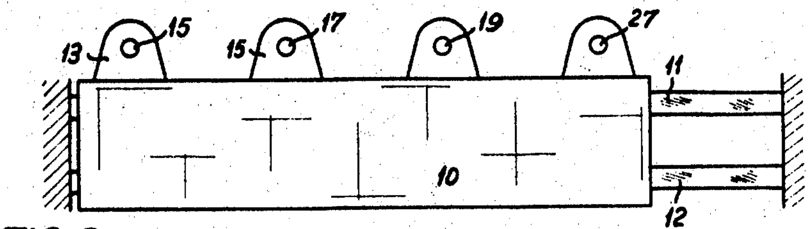
Figure 2A:
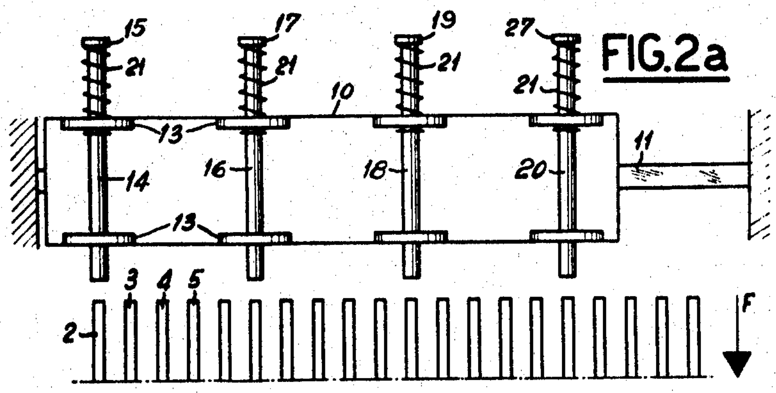

This system is constituted by a support 10 which can slide on fixed slides 11 and 12. This support carries cores four pairs of bearing lugs 13, FIGURE 2*a*, in which can slide the rods, 14, 16, 18 and 20 when a pressure is applied in the direction of arrow F (FIGURE 2*a*), against return spring 21.

One end of each rod constitutes a pushbutton 15, 17, 19, 27 and is controlled by a return spring 21, while the other end can operate a selected selection rod 2, 3.

Arrangements will be described below for moving support 10 along guides 11, 12 to any one of five positions, the spacings of which are the same as the spacings of rods 2, 3.

The spacing between adjacent rods 14, 16, 18 and 20 is equal to five times the space between the records, and between their selection rods 2, 3 etc. Thus in each position of support 10, the four selection pushbuttons are opposite four selection rods: e.g., 2, 7, 12, 17: and accordingly in each of the five positions of support 10, each pushbutton can select one out of five records selectively allocated thereto.

In each of its positions, support 10 makes available five records any one of which can be selected depending upon whether rod 14, 16, 18 or 20 has been pushed.

Figure 3:
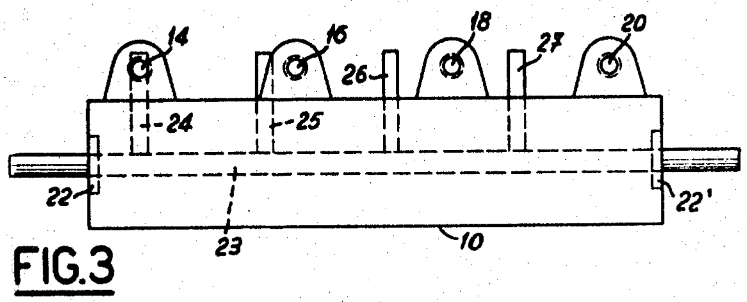
Figure 3A:
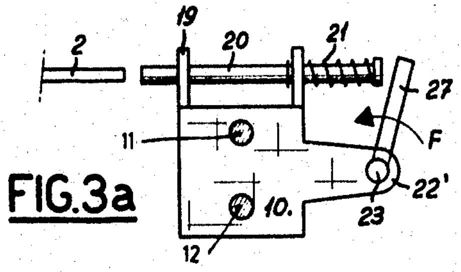

FIGS. 3, 3*a* show that support 10 also carries on the side nearest the press buttons 15, two end lugs 22 and 22' in which is slidably and rotatably journalled a spindle 23 carrying arms 24, 25, 26 and 27 corresponding to the number of rods, 14, 16, 18 and 20. The purpose of the arms 24 is to operate the pushbuttons 15, but the spacings between adjacent arms 24, 25, 26 and 27 is equal to the interaxis spacing of rods 14, 16, 18 and 20 less the distance between adjacent selection rods 2, 3; thus the spacing of arms 24, is equal to four record spacings as compared with a spacing equal to five record spacings for the pushbuttons 15.

The operating means for spindle 23 must move with support 10, so that the relation between the arms 24 and the pushbuttons is independent of movement of support 10.

If spindle 23 is moved along support 10, one record spacing at a time, the arms 24, 25, 26 and 27 will be successively brought in line with their respective buttons 15, so that only one pushbutton can be operated at a time.

The positioning mechanism for a selection can then be operated by first causing the simultaneous movement of support 10 and spindle 23 until rods 14, 16, 18 and 20 are respectively in front of pushbuttons 2, 7, 12, 17 or 3, 8, 13, 18; for example; and second by moving spindle 23 to position a particular arm in line with its respective pushbutton.

The actual operation of a selected selection rod 2, 3 is performed by rotating the spindle 23 in the anticlockwise direction F, FIG. 3*a*, so that one of its arms pushes a pushbutton and rod; e.g., 17, 16, which in turn will cause the selection rod (2, 3) with which it is aligned to move and release its disk.

There exist various means for commanding either manually or by means of an electric motor the relative movements of support 10 in comb 23.

Figure 4:
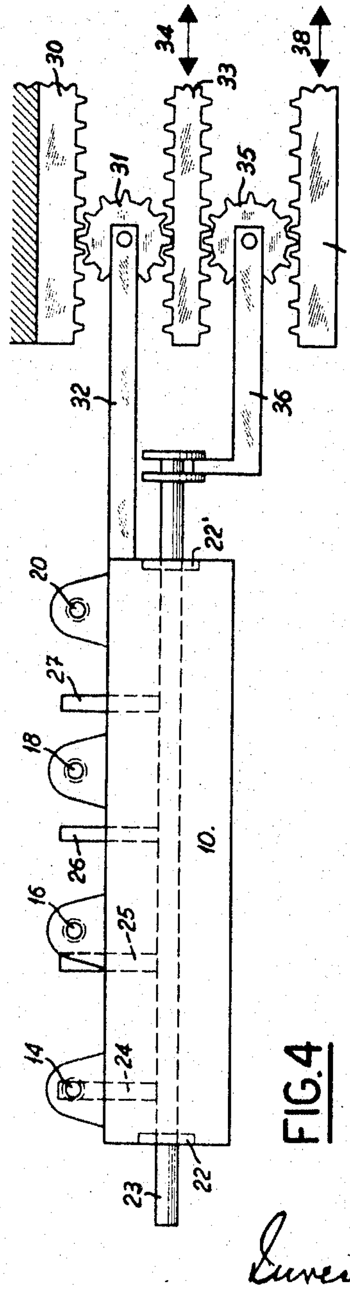
FIGURE 4 is a side view of the control system of the movable elements in a first modification.

In a first modification (FIGURE 4) support 10 and spindle 23 are controlled by a ratchet system. This system comprises a fixed ratchet 30 fast on the frame on which can roll a pinion 31 turning on a rod 32 secured to support 10.

A first movable ratchet 33, provided with teeth on its two faces, can move from left to right in the direction of arrow 34. A second pinion 35 meshes with the lower part of ratchet 33 and turns freely on an L-shaped arm 36 the base of which engages a sheave on spindle 23 so as to partake of its axial movement only This pinion 35 meshes also with second movable ratchet 37, which is moved from left to right in the direction of arrow 38.

If the first movable ratchet 33 alone is moved in the axis of arrow 34, the two pinions 31 and 35 will move along fixed ratchets 37 and 30 and will cause the simultaneous movement of support 10 and spindle 23.

On the contrary if only ratchet 33 is moved only pinion 35 will roll, driving only spindle 23.

Thus by actuating ratchet 33 and 37 along a path which is small relative to the length of the pushbutton array, the vernier assembly constituted by the support 10 and spindle 23 will make it possible to act on any single one of the twenty pushbuttons.

Figure 5:
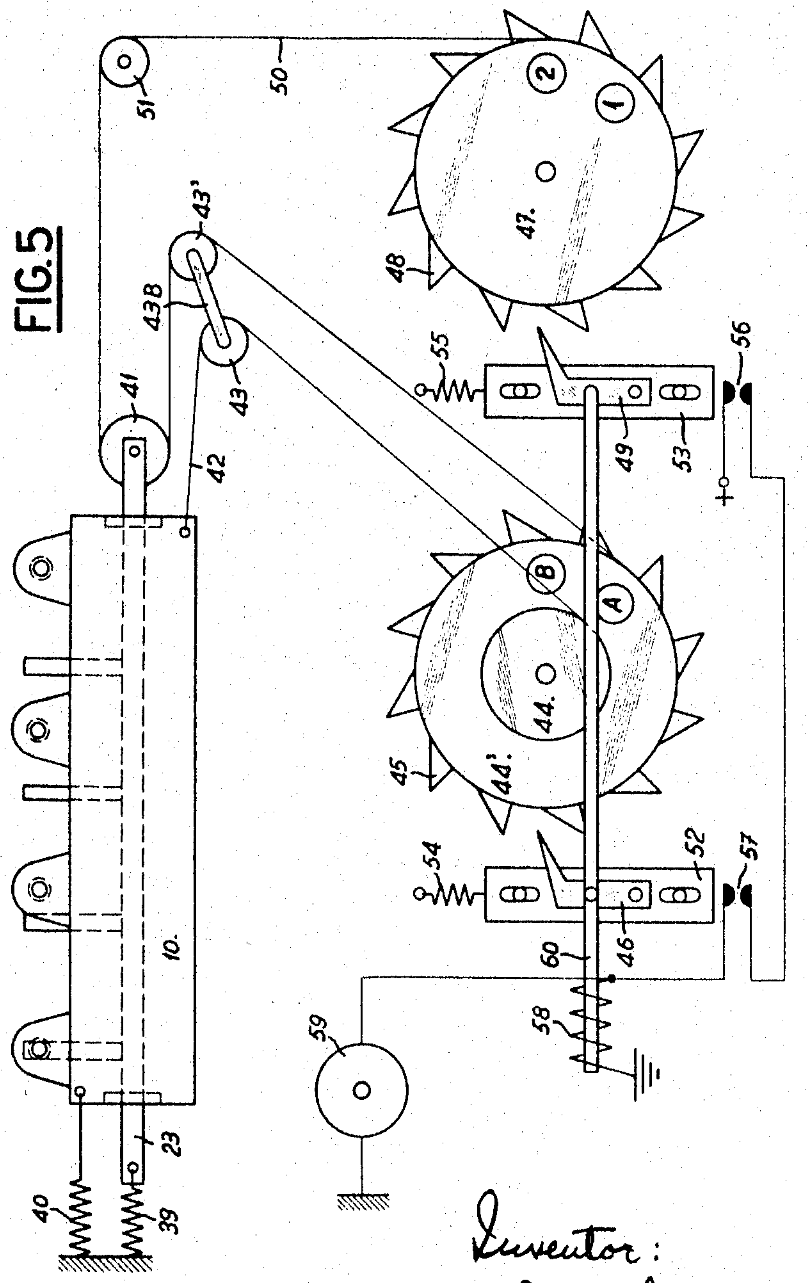
FIGURE 5 is a side view of the control system of the movable elements in a second modification.

In a second modification (FIGURE 5) support 10 and spindle 23 are respectively urged towards the left by springs 39 and 40.

Spindle 23 carries at its extremity a free rotatable pulley 41 and the edge of support 10 is secured by cable 42 which passes around the rotatable pulley 43 turning on a fixed frame and comes to wind on a drum 44 carrying tape 45 and between which engages a pawl 46.

A second drum 47 carrying teeth 48 can be blocked by a second pawl 49. A cable 50, wound round drum 47, bears on a free pulley 51 turning on a fixed point, then against pulley 41 fast on spindle 23, and comes down onto cable 42, to bear on pulley 43' fast on pulley 43 and winds around drum 44'.

If drums 44 and 44' are made to turn by a certain number of notches, support 10 and spindle 23 are driven simultaneously by cables 42 and 50. On the contrary, by turning drum 47, only comb 23 will move along the support.

Owning to this fact there is obtained the desired movement and according to the number of notches by which drums 44 and 47 have been turned, the vernier formed by support 10 and spindle 23 will come in selection position for a single pushbutton of the record changer.

The pushing in of this pushbutton can be obtained in various ways, for example, by means of the following device which is applicable to the second embodiment.

Pawls 46 and 49 are mounted on two sliders 52 and 53, urged upwardly by springs 54 and 55, which are weaker than springs 39 and 40.

Two electrical contacts in series 56 and 57 feed two electromagnets 58 and 59 in parallel. Electromagnet 58 is a solenoid, the armature of which carries a rod 60 pivotally connected to intermediate points on the pivoted pawls 46, 49. Electromagnet 59, not operationally positioned on the drawing, causes spindle 23, FIG. 3*a*, to turn around its axis so that one of its arms, aligned with a pushbutton, will initiate release of a record.

Drums 44 and 47 carry numbered finger-holes of the kind present in a telephone dial, drum 44 carrying letters A, B, etc., and drum 47 numbers 1, 2, etc. The selection takes place in the following manner. The user first actuates the dial on drums 44, 44' so that the assembly 10, 23 selects a set of five selection rods 2, 3. When the drums are in position, they will have a tendency to return to zero under the urging of springs 39 and 40, due to which pawl 46, in mesh with ratchet 45, will be moved downwards with slider 52 to close contacts 57. Slider 52 and the drums are then held.

When the user actuates the second dial on drums 47, the spindle 23 alone is operated to select a single pushbutton. Spring 39 will exert a pull via spindle 23 and cable 50 to rotate drum 47 counterclockwise so that ratchet 48 will move pawl 49, and slider 53, downwards sufficiently to close contacts 56.

The two electromagnets 58 and 59 are then fed with current via contacts 56, 57 in series.

Electromagnet 59 causes instantaneously the rocking of spindle 23, so that the selected arm 14, 16 operates a pushbutton and the selection rod aligned therewith to release the selected disc. Solenoid 58 then attracts rod 60, which retracts pawls 46 and 49, thus freeing drums 44 and 47 which are returned to zero, together with support 10 and spindle 23, by return springs 39 and 40.

It goes without saying that the number of twenty records is given here by way of example but in no way limits the scope of the invention nor the number of possible selections.

What is claimed is:

1. Mechanical selection device for an automatic record changer having records in adjacent positions comprising first and second sets of movable elements, the elements of said first set being equidistantly spaced apart by the distance between spaced record positions in said changer; the elements of said second set being equidistantly spaced by a distance corresponding to the spacing of said first set less the distance between two adjacent record positions, said two sets being so related and operated as to select any desired individual record position for release of a record; and a selection assembly including a first movable support in which are movably mounted both said first set of movable elements and a second movable support for said second set of movable elements in such relation that movement of said assembly as a whole and relative movement of said first and second supports combine to select a record for release, said second movable set of elements being spaced parallel arms, said arms being radially fixed to a spindle, said spindle being rotatably and axially movable on a support; said support being movable in said axial direction and carrying said first set of elements, said elements consisting of parallel coplanar rods mounted substantially at right angles to said spindle for longitudinal operation by said arms.

2. Device according to claim 1, comprising a set of parallel record-release rods which have the same spacing as the records, and which are coplanar and parallel with said first set of spaced parallel rods; means for moving said support together and with said spindle to align said spaced rods with a similarly spaced selection of record-release rods, means for axially moving said spindle to align a single one of its said arms with a single rod of said first set; means for rotating said spindle to cause said aligned arm to move axially said rod of said first set and the record-release rod aligned therewith to release the respective record.

3. Device according to claim 1, wherein said second support has second degree of freedom on said first support whereby one of said second set of movable elements can operate one of said first set of elements to cause release of a selected record.

4. Device according to claim 1, wherein said first and second supports are connected for parallel selection movements to respective first and second rotatable pinions; the first of said pinions being located between and meshing with a stationary ratchet bar and with a first movable ratchet bar, while said second pinion meshes with said first movable ratchet bar and with a second movable ratchet bar whereby movement of said first movable ratchet bar alone causes the movement of said two pinions to move the whole assembly, while the movement of said second movable ratchet bar alone causes the movement of said second support on said first support.

5. Device according to claim 1, wherein said movable supports are operated by respective cables, one end of each of which is connected to respective coaxial integral winding drums, the other end of the cable for said first support being connected to said support, the other end of the cable for said second support being connected to another separately operable winding drum whereby rotation of said integral winding drums alone moves the whole assembly, whereas rotation of said other drum alone moves said second support relative to said first support.

6. Device according to claim 1, where in movement of said asembly as a whole and of said second movable support are respectively controlled by telephone-type dials.

7. Device according to claim 5, wherein said winding drums carry ratchets and including: a pawl associated with each ratchet and mounted for movement to and from the respective ratchet and for controlled movement with the ratchet in the return direction of the winding drums; first electromagnetically controlled means for moving said second support to cause release of a selected record; second electromagnetically controlled means for moving the pawls simultaneously out of the ratchets, and a common operating circuit for said first and second electromagnetically controlled means jointly controlled by electrical contacts respectively operable by said pawls during their controlled movement with the ratchets, said first electromagnetically controlled means operating before said second electromagnetically operating means so that firstly a record is released and secondly the drums and the movable supports are returned to normal.

8. Device according to claim 7, wherein said respective sets of drums each carry a telephone type dial for operating same.

9. Automatic record selection device for a record changer according to claim 1, wherein the movements of said sets of movable elements are controlled by means of telephone-type dials.

References Cited

UNITED STATES PATENTS

| | | | |
|---|---|---|---|
| 2,345,545 | 3/1944 | Wright | 274—10.1 X |
| 2,398,067 | 4/1946 | Wingler | 274—10.1 |
| 2,572,609 | 10/1951 | Gierwiatowski | 274—10.1 |

HARRY N. HAROIAN, Primary Examiner